United States Patent Office 3,061,609
Patented Oct. 30, 1962

1

3,061,609
DERIVATIVES OF 1-(DIARYLHYDROXYALKYL)
PIPERIDINECARBOXAMIDES AND HYDRAZIDES
John W. Cusic, Skokie, and Robert W. Hamilton, Wilmette, Ill., assignors to G. D. Searle & Co., Chicago, Ill., a corporation of Delaware
No Drawing. Filed Apr. 27, 1961, Ser. No. 105,913
14 Claims. (Cl. 260—294)

The present invention relates to derivatives of 1-(diarylhydroxyalkyl)piperidinecarboxamides and hydrazides of the formula

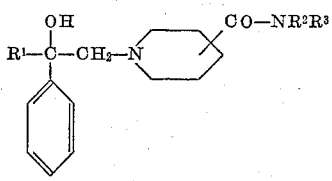

wherein $R^1$ is phenyl, benzyl, trifluoromethylphenyl, fluorophenyl or chlorophenyl, $R^2$ is hydrogen, lower alkyl or lower hydroxyalkyl and $R^3$ is hydrogen, amino, lower alkyl, lower hydroxyalkyl, lower dihydroxyalkyl or lower trihydroxyalkyl.

$R^2$ and $R^3$ can each represent such lower alkyl radicals as methyl, ethyl, straight-chained or branched propyl, butyl, pentyl or hexyl. $R^2$ and $R^3$ can likewise represent the monohydroxy derivatives of these lower alkyl radicals. In addition $R^3$ can represent dihydroxy and trihydroxyalkyl radicals such as dihydroxypropyl, dihydroxybutyl, trihydroxybutyl, dihydroxypentyl, trihydroxyhexyl and the like.

Equivalent to the foregoing compounds for purposes of the present invention are non-toxic salts thereof, exemplified by the salts formed with hydrochloric acid, hydrobromic acid, tartaric acid, maleic acid, methyl bromide, ethyl chloride and ethyl bromide.

The compounds to which this invention relates are useful because of their valuable pharmacological properties. Thus, for example, they are anti-inflammatory agents and appetite depressants; they counteract heat, swelling and redness characteristic of the inflammatory response to tissue injury. They have a quinidine-like action on experimentally induced cardiac arrhythmia and appear to inhibit hepatic cholesterol synthesis. Further, they inhibit growth of Diplococcus pneumoniae in vitro. Safety and effectiveness for any of these purposes in human beings has not been established at this time.

Manufacture of the subject compounds is accomplished by a route which begins with the treatment of an alkoxycarbonylpyridine with a primary or secondary amine or hydrazine; the pyridinecarboxamide or hydrazide thus prepared is subjected to catalytic hydrogenation, whereupon the corresponding piperidinecarboxamide or hydrazide is obtained. This piperidine derivative is alkylated with a primary alkyl halide of the formula

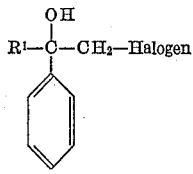

These alkylating agents are prepared by condensation of an ω-haloalkyl phenyl ketone with an aralkyl Grignard reagent according to the reaction

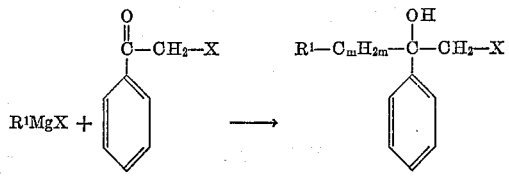

X being halogen. These halohydrins may be converted to the corresponding epoxides by treatment with base. The epoxides thus obtained are also useful in the alkylation step just described.

Conversion of the amine bases of this invention to corresponding acid addition salts is accomplished by simple admixture of these compounds with one equivalent of any of various inorganic and strong organic acids.

The following examples describe in detail certain of the compounds illustrative of the present invention and methods which have been devised for their manufacture. However, the invention is not to be construed as limited thereby either in spirit or in scope, since it will be apparent to those skilled in the art of organic synthesis that many modifications, both in materials and of methods, may be practiced without departing from the purpose and intent of this disclosure. In the examples hereinafter detailed, temperatures are given in degrees centigrade, pressures in pounds per square inch, and relative amounts of materials in parts by weight, except as otherwise noted.

This application is a continuation-in-part of copending application Serial No. 44,891, filed July 25, 1960, now abandoned.

Example 1

A mixture of 62 parts of 2-chloro-1,1-diphenylethanol, 31 parts of 4-carbamoylpiperidine, 17 parts of potassium hydroxide and 2500 parts of absolute ethanol is heated under reflux for 16 hours. At the end of this time the reaction mixture is allowed to cool to room temperature, and the ethanol is removed by evaporation at reduced pressure. The residue thus obtained is taken up in chloroform, and the resultant suspension is extracted twice with water. The organic phase is extracted with dilute hydrochloric acid, and the water layer is rendered alkaline with aqueous sodium hydroxide. The suspension thus obtained is extracted with chloroform, and the organic layer is dried over anhydrous potassium carbonate; the chloroform is removed by evaporation at reduced pressure. The resultant residue is recrystallized successively with absolute ethanol and hexane to give pure 1-(2,2-diphenyl-2-hydroxyethyl)-4-carbamoylpiperidine, melting at about 138–139°, with prior softening. The structure may be expressed as

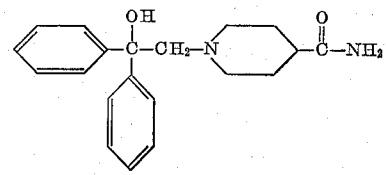

Example 2

A mixture of 79 parts of 1,1-diphenylethylene oxide, 51 parts of 3-carbamoylpiperidine and a few parts of water is heated at about 100° for 6 hours. The oil thus obtained is taken up in chloroform, and the resultant solution is extracted twice with water. Dilute hydrochloric acid is added to the organic layer, and the resultant solid material is removed by filtration. The 1-(2,2-diphenyl-2-hydroxyethyl)-3-carbamoylpiperidinium chloride thus obtained melts at about 237–238°, with evolution of a gas. The structure may be expressed as

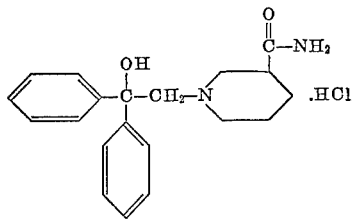

Example 3

A mixture of 240 parts of 4-(N-methylcarbamoyl)pyridine, 24 parts of 5% ruthenium on charcoal, and 790 parts of ethanol is treated with hydrogen at 1000 pounds per square inch at 100° for 8 hours. The catalyst is removed by filtration, and the filtrate is evaporated to dryness at reduced pressure. The resultant residue is recrystallized from benzene to give 4-(N-methylcarbamoyl)piperidine, melting at 135–137°. A mixture of 36 parts of 4-(N-methylcarbamoyl)piperidine, 62 parts of 2-chloro-1,1-diphenylethanol, 17 parts of potassium hydroxide and 2500 parts of absolute ethanol is heated under reflux for 16 hours. At the end of this time the reaction mixture is allowed to cool to room temperature, and the ethanol is removed by evaporation at reduced pressure. The residue thus obtained is taken up in chloroform, and the resultant suspension is extracted twice with water. The organic phase is extracted twice with dilute hydrochloric acid, and the water layer is made alkaline with aqueous sodium hydroxide. The suspension thus obtained is extracted with chloroform, and the organic layer is dried over anhydrous potassium carbonate; the chloroform is removed by evaporation at reduced pressure. The resultant residue is recrystallized successively from absolute ethanol and hexane to give 1-(2,2-diphenyl-2-hydroxyethyl)-4-(N-methylcarbamolyl)piperidine, melting at about 169–170°. The structure may be expressed as

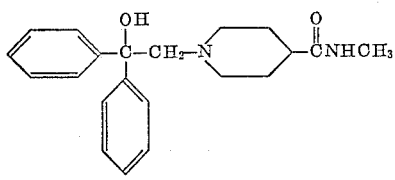

Example 4

A mixture of 272 parts of 4-(N-ethylcarbamoyl)pyridine, 20 parts of 5% ruthenium on charcoal and 790 parts of ethanol is treated with hydrogen at 1000 pounds per square inch at 100° for 8 hours. The catalyst is removed by filtration, and the filtrate is evaporated to dryness at reduced pressure. The resultant residue is recrystallized from benzene to give 4-(N-ethylcarbamoyl)piperidine. A mixture of 57 parts of 4-(N-ethylcarbamoyl)piperidine, 79 parts of 1,1-diphenylethylene oxide and a few parts of water is heated at about 100° for 6 hours. The oil thus obtained is taken up in chloroform, and the resultant solution is extracted twice with water. Dilute hydrochloric acid is added to the organic layer, and the 1-(2,2-diphenyl-2-hydroxyethyl)-3-(N-ethylcarbamoyl)piperidinum chloride thus obtained is taken up in water, and the resultant solution is made basic with aqueous sodium hydroxide. The suspension which forms is extracted with chloroform, and the organic layer is dried over anhydrous potassium carbonate; the solvent is removed by evaporation at reduced pressure. The residue is recrystallized successively from absolute ethanol and hexane to give 1-(2,2-diphenyl-2-hydroxyethyl)-3-(N-ethylcarbamoyl)piperidine, melting at 135–138°. The structure may be expressed as

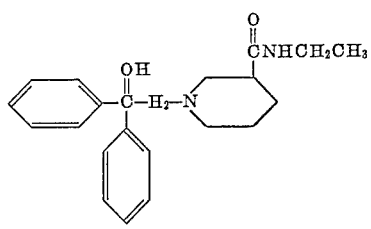

Example 5

A mixture of 157 parts of 4-[N-(2-hydroxyethyl)carbamoyl]pyridine, 15 parts of 5% ruthenium on charcoal and 790 parts of ethanol is treated with hydrogen at 1000 pounds per square inch at 120° for 8 hours. At the end of this time the volume of the reaction mixture is reduced by evaporation to about one-third of its initial volume; hexane is added, and the resultant solution is cooled to 0°. The precipitate thus obtained is removed by filtration to give 4-[N-(2-hydroxyethyl)carbamoyl]piperidine, melting at 129–131°. Substitution of 69 parts of 4-[N-(2-hydroxyethyl)carbamoyl]piperidine for the 4-(N-ethylcarbamoyl)piperidine in the procedure of Example 4 gives 1-(2,2-diphenyl-2-hydroxyethyl)-4-[N-(2-hydroxyethyl)carbamoyl]piperidine, melting at about 155–156°. The structure may be expressed as

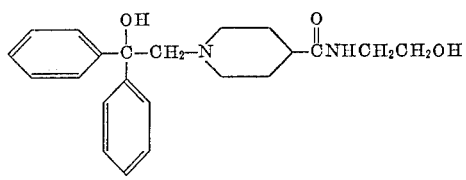

Example 6

Substitution of 69 parts of 3-[N-(2-hydroxyethyl)carbamoyl]piperidine for the 4-(N-ethylcarbamoyl)piperidine of Example 4 gives 1-(2,2-diphenyl-2-hydroxyethyl)-3-[N-(2-hydroxyethyl)carbamoyl]piperidine. The free base is dissolved in butanone, and isopropyl alcohol, saturated with hydrogen chloride gas, is added. The resultant precipitate is recrystallized successively from ethanol and butanone, to give 1-(2,2-diphenyl-2-hydroxyethyl)-3-[N-(2-hydroxyethyl)carbamoyl]piperidinium chloride melting at 186–190°. The structure may be expressed as

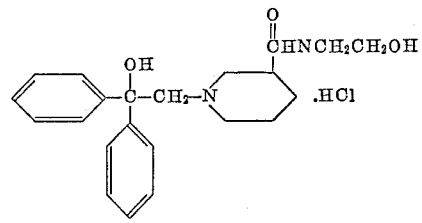

Example 7

A mixture of 69 parts of methyl pyridine-4-carboxylate and 150 parts of 3-hydroxypropylamine is heated under reflux for 4 hours. The excess 3-hydroxypropylamine is removed by distillation, and the residue is taken up in a mixture of 150 parts of absolute ethanol and 450 parts of benzene. The solution thus obtained is cooled to 0° and the resultant precipitate is removed by filtration, to give 4-[N-(3-hydroxypropyl)carbamoyl]pyridine, melting at about 105–106°. A mixture of 58 parts of 4-[N-(3-hydroxypropyl)carbamoyl]pyridine, 6 parts of ruthenium oxide on charcoal and 790 parts of ethanol is treated with hydrogen at 900 pounds per square inch at 100° for 7 hours. At the end of this time the volume of the mixture is reduced to about one-fourth of its original value by evaporation of the solvent, and then filtered; addition of hexane to the filtrate causes precipitation. The precipitate is removed by filtration to give 4-[N-(3-hydroxypropyl)-carbamoyl]piperidine, melting at 134–136°. A mixture of 75 parts of 4-[N-(3-hydroxypropyl)carbamoyl]piperidine, 79 parts of 1,1-diphenylethylene oxide and a few parts of water is heated at about 100° for 6 hours. The oil thus obtained is taken up in chloroform, and the resultant solution is extracted twice with water. Dilute hydrochloric acid is added to the organic layer, and the 1-(2,2-diphenyl-2-hydroxyethyl)-4-[N-(3-hydroxypropyl)carbamoyl]-piperidinium chloride thus obtained is taken up in water, and the resultant solution is made basic with aqueous sodium hydroxide. The suspension which forms is extracted with chloroform, and the organic layer is dried over anhydrous potassium carbonate; the solvent is removed by evaporation at reduced pressure. The residue is recrystallized successively from absolute ethanol and hexane to give 1-(2,2-diphenyl-2-hydroxyethyl)-4-[N-(3-hydroxypropyl)carbamoyl]piperidine, melting at 129–131°. The structure may be expressed as

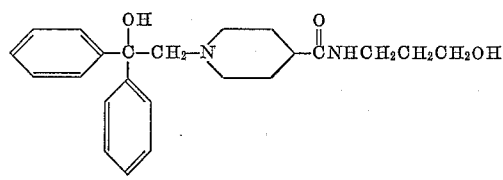

*Example 8*

Substitution of 150 pars of 2-hydroxypropylamine for the 3-hydroxypropylamine of Example 7 provides, by the procedure therein detailed, successively 4-[N-(2-hydroxypropyl)carbamoyl]pyridine, melting at 89–94°; 4-[N-(2-hydroxypropyl)carbamoyl]piperidine, melting at about 132–133°; and 1-(2,2-diphenyl-2-hydroxyethyl)-4-[N-(2-hydroxypropyl)carbamoyl]piperidine, melting at about 165–166°. The structure may be expressed as

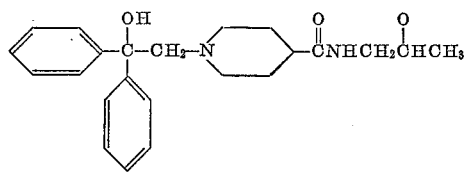

*Example 9*

Substitution of 178 parts of 1,1-dimethyl-2-hydroxyethylamine for the 3-hydroxypropylamine of Example 7 provides, by the procedure therein detailed, successively 4-[N-(1,1-dimethyl-2-hydroxyethyl)carbamoyl]pyridine, melting at 110–113°; 4-[N-(1,1-dimethyl-2-hydroxyethyl)carbamoyl]piperidine, melting at 148–152°; and 1-(2,2-diphenyl-2-hydroxyethyl)-4-[N-(1,1-dimethyl-2-hydroxyethyl)carbamoyl]piperidine, melting at about 189–190°. The structure may be expressed as

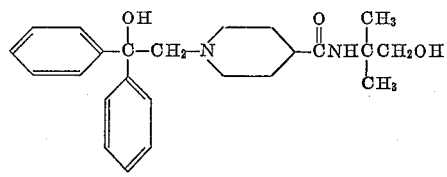

*Example 10*

Substitution of 178 parts of 2-methyl-2-hydroxypropylamine for the 3-hydroxypropylamine of Example 7 provides, by the procedure therein detailed, successively 4-[N-(2-methyl-2-hydroxypropyl)carbamoyl]pyridine, melting at 135–139°; 4-[N-(2-methyl-2-hydroxypropyl)carbamoyl]piperidine, melting at 117–145°; and 1-(2,2-diphenyl-2-hydroxyethyl)-4-[N-(2-methyl-2-hydroxypropyl)carbamoyl]piperidine, melting at 179–181°. The structure may be expressed as

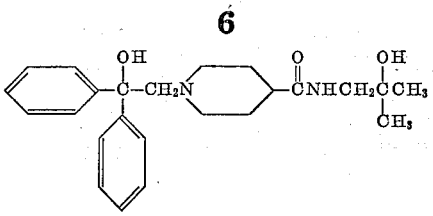

*Example 11*

Substitution of 210 parts of 2-hydroxymethyl-2-aminopropanol for the 3-hydroxypropylamine of Example 7 provides, by the procedure therein detailed, successively 4-[N-(1-methyl-1-hydroxymethyl-2-hydroxyethyl)carbamoyl]-pyridine, melting at 139–141°; 4-[N-(1-methyl-1-hydroxymethyl-2-hydroxyethyl)carbamoyl]piperidine, melting at 162–164°; and 1-(2,2-diphenyl-2-hydroxyethyl)-4-[N-(1-methyl-1-hydroxymethyl-2-hydroxyethyl)carbamoyl]-piperidine, melting at 152–154°. The structure may be expressed as

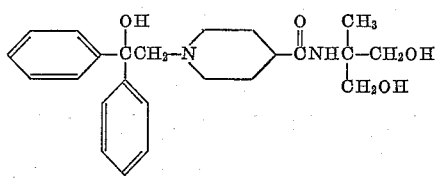

*Example 12*

Substitution of 242 parts of 2-hydroxymethyl-2-aminopropane-1,3-diol for the 3-hydroxypropylamine of Example 7 provides, by the procedure therein detailed, successively 4-{N-[1,1-di(hydroxymethyl)-2-hydroxyethyl]-carbamoyl}pyridine, melting at 138–144°; 4-{N-[1,1-di(hydroxymethyl)-2-hydroxyethyl]carbamoyl}piperidine, melting at 153–163°; and 1-(2,2-diphenyl-2-hydroxyethyl)-4-{N-[1,1-di(hydroxymethyl)-2-hydroxyethyl]-carbamoyl}piperidine, melting at about 164–165°. The structure may be expressed as

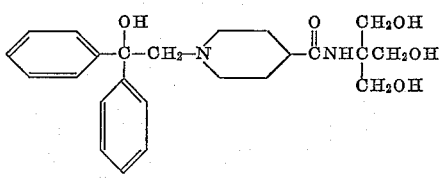

*Example 13*

Substitution of 150 parts of (2-hydroxyethyl)methylamine for the 3-hydroxy propylamine of Example 7 provides, by the procedure therein detailed, successively 4-[N-methyl-N-(2-hydroxyethyl)carbamoyl]pyridine, as an oil; 4-[N-methyl-N-(2-hydroxyethyl)carbamoyl]piperadine, as an oil; and 1-(2,2-diphenyl-2-hydroxyethyl)-4-[N-methyl-N-(2-hydroxyethyl)carbamoyl]piperidine, melting at 122–125°. The structure may be expressed as

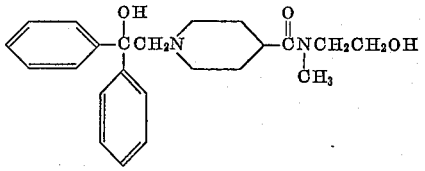

*Example 14*

Substitution of 178 parts of (2-hydroxyethyl)ethylamine for the 3-hydroxypropylamine of Example 7 provides, by the procedure therein detailed, successively 4-[N-ethyl-N-(2-hydroxyethyl)carbamoyl]pyridine, as an oil; 4-[N-ethyl-N-(2-hydroxyethyl)carbamoyl]piperidine, as an oil; and 1-(2,2-diphenyl-2-hydroxyethyl)-4-[N- ethyl-N-(2 - hydroxyethyl)carbamoyl]piperidine, melting at 135–139°. The structure may be expressed as

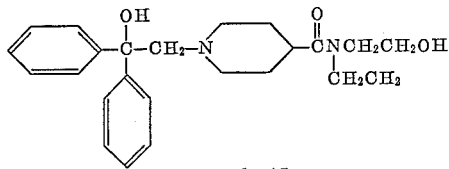

Example 15

Substitution of 70 parts of 4-[N,N-di(2-hydroxyethyl)-carbamoyl]pyridine for the 4-[N-(3-hydroxypropyl)carbamoyl]pyridine of Example 7 provides, by the procedure therein detailed, successively 4-[N,N-di(2-hydroxyethyl)-carbamido]-piperidine, as an oil and 1-(2,2-diphenyl-2-hydroxyethyl) - 4 - [N,N-di(2-hydroxyethyl)carbamoyl]-piperidine, melting at 149–151°. The structure may be expressed as

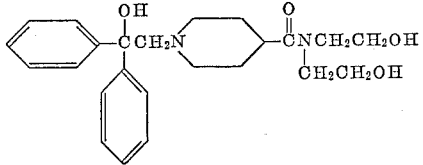

Example 16

To a stirred solution of 78 parts of phenacyl chloride in 700 parts of anhydrous ether maintained under nitrogen at 0 to —5° is added slowly a solution of 75 parts of benzylmagnesium chloride in 300 parts of anhydrous ether; the resultant mixture is stirred at 0 to —5° for 30 minutes, and then decomposed by the addition of a solution of 100 parts of ammonium chloride in 400 parts of water at 0–5°. The water layer is extracted with ether, and the extracts are added to the ethereal solution. The resultant solution is dried over anhydrous potassium carbonate, and then subjected to distillation at diminished pressure; 2-hydroxy - 2,3 - diphenylpropyl chloride is collected at 140–150°/0.2 mm. A mixture of 78 parts of 2-hydroxy-2,3-diphenylpropyl chloride, 25 parts of sodium hydroxide, and 126 parts of water is stirred vigorously at 80° for one hour. The resultant mixture is extracted with ether, and the ethereal solution thus obtained is dried over anhydrous potassium carbonate. The ether is removed by evaporation to give an oily residue of crude 1-benzyl-1-phenylethylene oxide. A mixture of 84 parts of crude 1-benzyl-1-phenylethylene oxide, 51 parts of 4-carbamoylpiperidine, and a small amount of water is heated at about 100° for 4 hours. The resultant mixture solidifies on cooling, and is subjected to successive recrystallizations from ethanol and hexane. The 1-(2-hydroxy - 2,3 - diphenylpropyl)-4-carbamoylpiperidine thus obtained melts at 151–153°. The structure may be expressed as

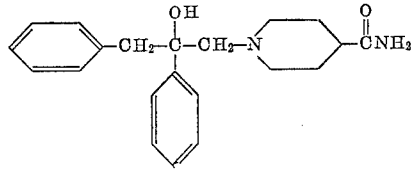

Example 17

Substitution of 66 parts of 4-[N-(2-hydroxyethyl)carbamoyl]piperidine for the 4-carbamidopiperidine of Example 16 provides, by the procedure therein detailed, 1-(2 - hydroxy-2,3-diphenylpropyl)-4-[N-(2-hydroxyethyl)-carbamoyl]-piperidine, melting at 123–125°. The structure may be expressed as

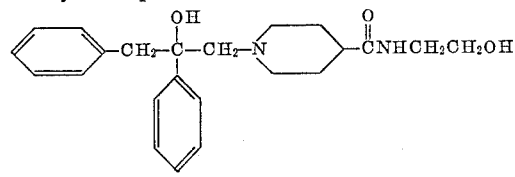

Example 18

Substitution of 92 parts of 1-(4-chlorophenyl)-1-phenylethylene oxide for the 1,1-diphenylethylene oxide and 69 parts of 4-[N-(2-hydroxyethyl)carbamoyl]piperidine for the 4-(N-ethylcarbamoyl)piperidine of Example 4 gives, by the procedure therein detailed, 1-[2-(4-chlorophenyl)-2-phenyl - 2 - hydroxyethyl]-4-[N-(2 - hydroxyethyl)carbamoyl]-piperidine, melting at 100–102°, with evolution of a gas. The structure may be expressed as

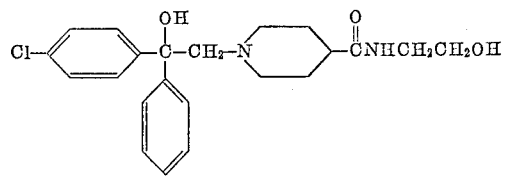

Example 19

Substitution of 100 parts of p-fluorophenylmagnesium bromide for the benzylmagnesium chloride of Example 16 gives, by the procedure therein detailed, successively 1-(4-fluorophenyl)-1-phenyl-2-chloroethanol, boiling at 152–155°/1.0 mm.; 1 - (4-fluorophenyl) - 1 - phenylethylene oxide, as an oil; and 1-[2-(4-fluorophenyl)-2-phenyl-2-hydroxyethyl]-4-carbamoyl piperidine, melting at 87–90° with evolution of a gas. The structure may be expressed as

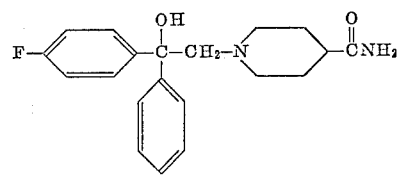

Example 20

Substitution of 107 parts of 1-(4-fluorophenyl)-1-phenylethylene oxide for the 1,1-diphenylethylene oxide and 86 parts of 4-[N-(2-hydroxyethyl)carbamoyl]piperidine for the 3-(N-ethylcarbamido)piperidine of Example 4 gives, by the procedure therein detailed, 1-[2-(4-fluorophenyl)-2 - phenyl - 2 - hydroxyethyl]-4-[N-(2-hydroxyethyl)carbamoyl]piperidine, melting at 97–102°. The structure may be expressed as

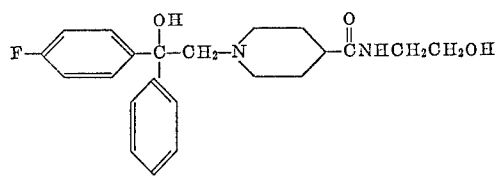

Example 21

To a stirred solution of 38 parts of phenacyl chloride in 380 parts of tetrahydrofuran maintained under nitrogen at 0 to —5° is added slowly a solution of 41 parts of o-trifluoromethylphenylmagnesium chloride in 80 parts of tetrahydrofuran; the resultant mixture is stirred at 0 to —5° for 30 minutes, and then decomposed by addition of a solution of 40 parts of ammonium chloride in 160 parts of water. The tetrahydrofuran layer is separated, and the water layer is extracted with ether. The combined tetrahydrofuran-ether extracts are dried over anhydrous potassium carbonate, and then subjected to distillation at diminished pressure; 2-hydroxy-2-phenyl-2-(o-trifluoromethylphenyl)ethyl chloride is collected at 120–122°/0.1 mm. A mixture of 65 parts of 2-hydroxy-2-phenyl-2-(o-trifluoromethylphenyl)ethyl chloride, 18 parts of sodium hydroxide and 90 parts of water is stirred vigorously at 80° for 1 hour. The resultant mixture is extracted with ether, and the ethereal solution thus obtained is dried over anhydrous potassium carbonate. The ether is removed by evaporation to give an oily residue of crude 1-phenyl-1-(o-trifluoromethylphenyl)ethylene oxide. A mixture of 53 parts of 1-(o-trifluoromethylphenyl)ethylene oxide, 26 parts of 4-carbamoylpiperidine and a small amount of water is heated at about 100° for 4 hours. The reaction mixture is partitioned in chloroform and water. The organic phase is washed once with water, and extracted with dilute hydrochloric acid. The acid extract is rendered alkaline with aqueous sodium hydroxide, and extracted with chloroform. The resultant organic solution is dried over anhydrous potassium carbonate, and the chloroform is removed by evaporation. The resultant residue is recrystallized successively from benzene and hexane to give pure 1-[2-(2-trifluoromethylphenyl)-2-phenyl-2-hydroxyethyl]-4-carbamoylpiperidine, melting at 121–123°. The structure may be expressed as

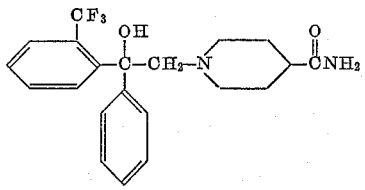

*Example 22*

A mixture of 79 parts of 1,1-diphenylethylene oxide, 84 parts of isonipecotic acid hydrazide dihydrochloride, 32 parts of sodium hydroxide and 500 parts of 1-butanol is heated at 90° C. for 6 hours with occasional stirring. The butanol is distilled off under vacuum. The residue is extracted with chloroform. This extract is washed with water and then extracted with dilute aqueous hydrochloric acid. The extract of the hydrochloride of the 1-(2,2-diphenyl-2-hydroxyethyl)-4-piperidinecarboxylic acid hydrazide thus obtained is washed with chloroform, rendered alkaline by addition of aqueous sodium hydroxide and extracted with chloroform. This extract is dried over anhydrous potassium carbonate and evaporated. Recrystallization of the residue from a mixture of benzene and hexane yields the free base. It melts at about 110–116° C. after softening at about 82° C. and sintering at about 101° C. It has the structural formula

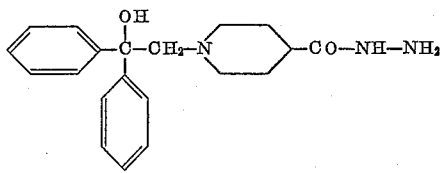

Substitution of 84 parts of nipecotic acid hydrazide in the foregoing procedure yields 1-(2,2-diphenyl-2-hydroxyethyl)-3-piperidinecarboxylic acid hydrazide, which also melts with decomposition.

What is claimed is:
1. A compound of the formula

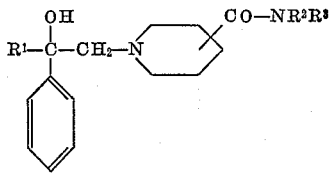

wherein $R^1$ is a member of the class consisting of phenyl, trifluoromethylphenyl, fluorophenyl, and chlorophenyl, $R^2$ is a member of the class consisting of hydrogen, lower alkyl and lower hydroxyalkyl, and wherein $R^3$ is a member of the class consisting of hydrogen, amino, lower alkyl, lower hydroxyalkyl, lower dihydroxyalkyl and lower trihydroxyalkyl.

2. A compound of the formula

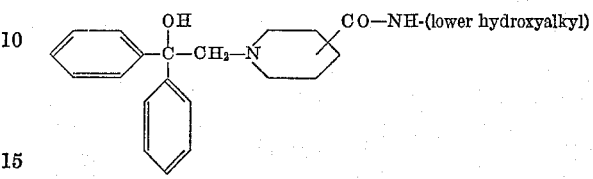

3. 1-(2,2-diphenyl - 2-hydroxyethyl)-4-[N-(2-hydroxyethylcarbamoyl]piperidine.
4. 1-(2,2-diphenyl - 2-hydroxyethyl)-3-[N-(2-hydroxyethyl)carbamoyl]piperidine.
5. 1-(2,2-diphenyl - 2 - hydroxyethyl)-4-[N-(1-methyl-1-hydroxymethyl-2-hydroxyethyl)carbamoyl]piperidine.
6. 1 - (2,2-diphenyl-2-hydroxyethyl)-4-{N-[1,1-di(hydroxymethyl)-2-hydroxyethyl]carbamoyl}piperidine.
7. 1 - [2-(4-fluorophenyl)-2-phenyl-2-hydroxyethyl]-4-[N-(2-hydroxyethyl)carbamoyl]piperidine.
8. A compound of the formula

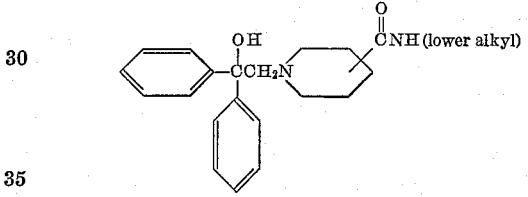

9. 1 - (2,2 - diphenyl-2-hydroxyethyl)-4-(N-methylcarbamoyl)piperidine.
10. 1 - (2,2-diphenyl - 2 - hydroxyethyl)-3-(N-ethylcarbamoyl)piperidine.
11. A compound of the formula

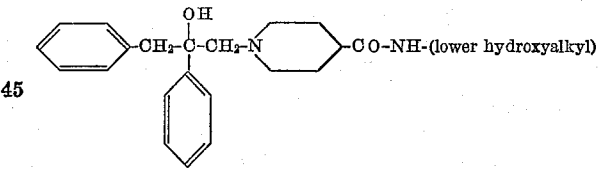

12. 1-(2-hydroxy-2,3-diphenylpropyl)-4-[N-(2-hydroxyethyl)carbamoyl]piperidine.
13. 1-[2-(2-trifluoromethylphenyl)-2-phenyl-2-hydroxyethyl]-4-carbamoylpiperidine.
14. A compound of the formula

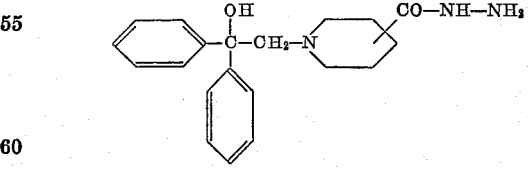

No references cited.

UNITED STATES PATENT OFFICE
CERTIFICATE OF CORRECTION

Patent No. 3,061,609                                  October 30, 1962

John W. Cusic et al.

It is hereby certified that error appears in the above numbered patent requiring correction and that the said Letters Patent should read as corrected below.

Column 2, lines 1 to 7, the right-hand formula, for that portion reading "$R^1-C_mH_{2m}-$" read -- $R^1$---; column 3, lines 53, 59 and 60, for "4-(N-ethylcarbamoyl)", each occurrence, read -- 3-(N-ethylcarbamoyl) --; column 4, lines 1 to 10, the left-hand portion of the formula should appear as shown below instead of as in the patent:

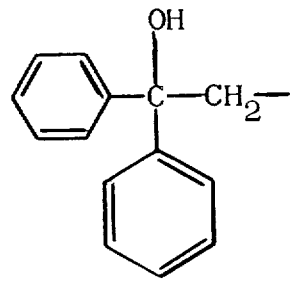

same column 4, lines 22 and 37, strike out "4-", each occurrence; column 5, lines 37 to 44, the right-hand portion of the formula reading:

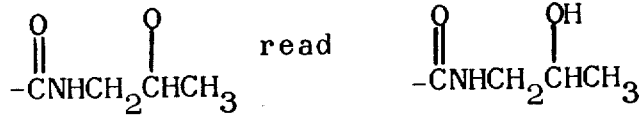

column 7, line 15, for "carbamido]-piperidine" read -- carbamoyl]piperidine --; column 8, line 5, strike out "4-".

Signed and sealed this 21st day of January 1964.

(SEAL)
Attest:
ERNEST W. SWIDER

Attesting Officer

EDWIN L. REYNOLDS

Acting Commissioner of
Patents